US011736544B1

(12) United States Patent
Holmlund et al.

(10) Patent No.: US 11,736,544 B1
(45) Date of Patent: Aug. 22, 2023

(54) ROUTING AND CAPACITY MANAGEMENT SYSTEM FOR CO-LOCATED STREAMING SERVICE

(71) Applicant: Amazon Technologies, Inc., Seattle, WA (US)

(72) Inventors: Mattias Holmlund, Taby (SE); Anubhav Gupta, Bellevue, WA (US); Vineet Ghatge Hemantkumar, Kirkland, WA (US); Jorge Peixoto Vasquez, Mercer Island, WA (US); Vinay Bhat, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/936,317

(22) Filed: Sep. 28, 2022

(51) Int. Cl.
| | | |
|---|---|---|
| *H04L 65/61* | (2022.01) | |
| *H04L 43/0882* | (2022.01) | |
| *H04L 67/143* | (2022.01) | |
| *H04L 43/0864* | (2022.01) | |
| *H04L 45/00* | (2022.01) | |
| *H04L 41/12* | (2022.01) | |

(52) U.S. Cl.
CPC .............. *H04L 65/61* (2022.05); *H04L 41/12* (2013.01); *H04L 43/0864* (2013.01); *H04L 43/0882* (2013.01); *H04L 45/70* (2013.01); *H04L 67/143* (2013.01)

(58) Field of Classification Search
CPC ..... H04L 65/61; H04L 41/12; H04L 43/0864; H04L 43/0882; H04L 45/70; H04L 67/143
See application file for complete search history.

(56) References Cited

U.S. PATENT DOCUMENTS

| | | | | |
|---|---|---|---|---|
| 2013/0282832 | A1* | 10/2013 | Bharadhwaj | H04L 69/04 709/205 |
| 2016/0164761 | A1* | 6/2016 | Sathyanarayana | H04L 41/046 709/219 |
| 2018/0367498 | A1* | 12/2018 | Bliss | H04L 45/74 |
| 2019/0222666 | A1* | 7/2019 | Uppal | H04L 45/126 |

\* cited by examiner

*Primary Examiner* — Benjamin M Thieu

(74) *Attorney, Agent, or Firm* — Knobbe, Martens, Olson & Bear, LLP

(57) ABSTRACT

System and methods are provided that can address co-locating content delivery services in a CDN and streaming egress services on the same computing devices in the same point of presence (PoP). A control plane of the content streaming service sends a request for a PoP for a client. A routing and capacity management system processes logs from the services to monitor resource usage at respective PoPs and/or border links. The routing and capacity management system can respond to the streaming control plane and identify a suitable PoP based on the monitored resource usage of the PoPs and/or border links. Based on the monitored resource usage, the routing and capacity management system instructs the streaming control plane to limit the load associated with one or more clients served by a PoP, which causes disconnected clients to reconnect to the content streaming service thereby re-routing traffic and rebalancing computing resource usage.

20 Claims, 7 Drawing Sheets

ROUTING AND CAPACITY MANAGEMENT SYSTEM FOR CO-LOCATED STREAMING SERVICE

BACKGROUND

User Datagram Protocol (UDP) is a transport-layer protocol. UDP is a part of the Internet Protocol suite, referred to as UDP/IP suite. UDP is an alternative to Transmission Control Protocol (TCP). TCP is a connection-oriented protocol, whereas UDP is a connectionless protocol. UDP is relatively faster than TCP and has lower latency; however, TCP can retransmit lost data packets and UDP does not. UDP can be used as the transport layer for real-time streaming due to its speed and low latency. Moreover, retransmission may generally not be a priority for real-time streaming.

A content delivery network (CDN) refers to a geographically distributed group of computing devices that work together to deliver network content. Points of presence in a CDN refers to servers that are strategically located near client devices, such as being placed near high-density network exchange points. The servers in a CDN can provide content using the Hypertext Transfer Protocol (HTTP), an application layer protocol that can and often runs over TCP.

BRIEF DESCRIPTION OF THE DRAWINGS

These and other features, aspects, and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

Figure 1:
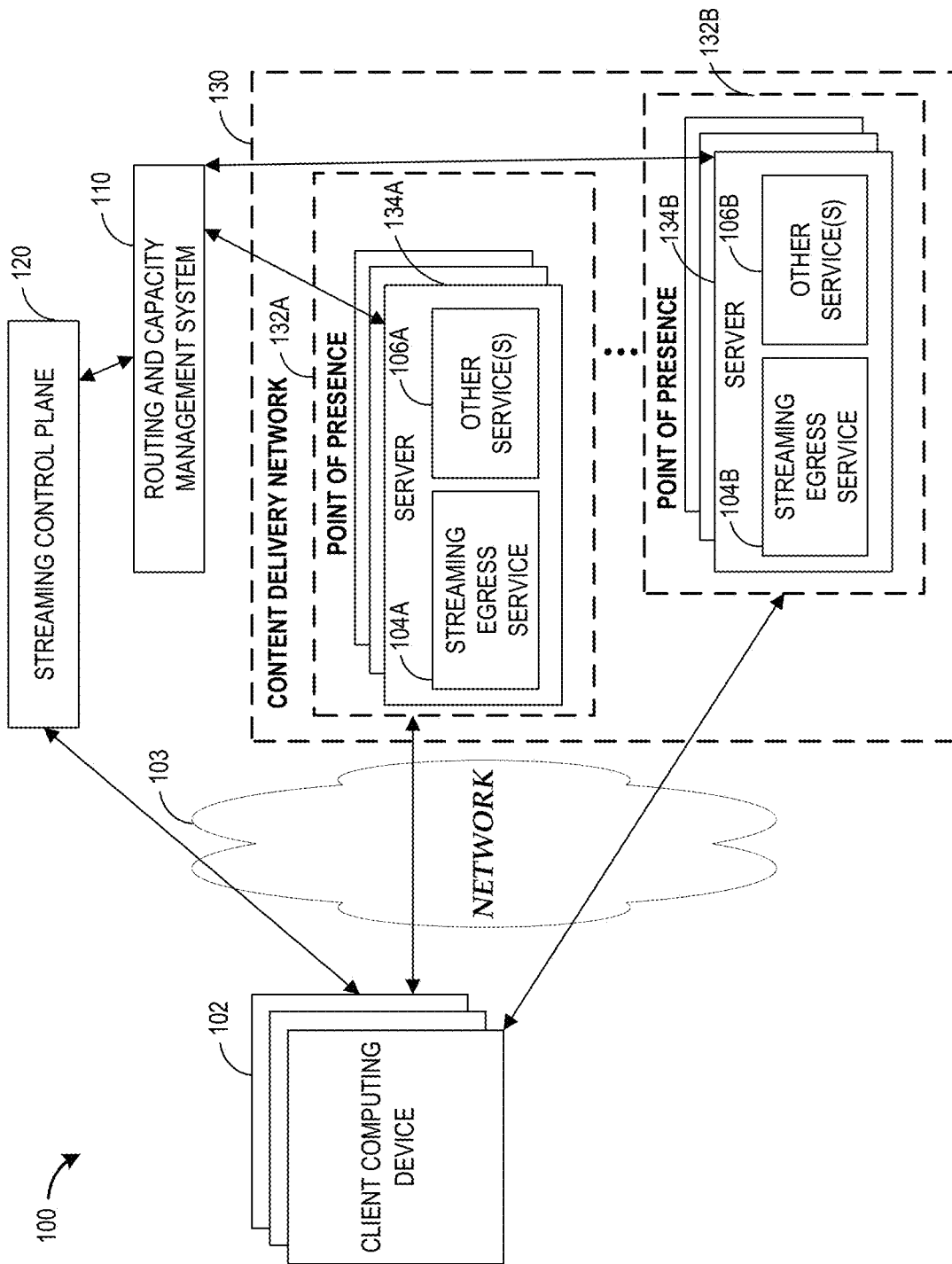
FIG. 1 is a schematic block diagram depicting an illustrative network environment with a Content Delivery Network with points of presence, a streaming control plane, a routing and capacity management system, and a client computing device.

A content streaming system, such as a system that uses UDP, can stream content in substantially real time. As described above, a CDN and the points of presence (PoPs) in a CDN can provide network content using HTTP. In some existing systems, the content streaming system and a CDN can be hosted separately and can be entirely separate systems. However, in other systems, it may be advantageous to host the content delivery services in a CDN and content streaming services in the same PoPs.

However, co-locating content delivery services in a CDN and streaming egress services on the same computing devices in the same PoPs can present one or more technical challenges. The co-located services may share the computing resources on the same computing devices. If too many requests are routed to the same PoPs, then the outgoing links of a point of presence (PoP) can become saturated. Moreover, it would be advantageous to assign streaming clients to a suitable PoP for load balancing purposes; however, a mechanism for such assignment may not exist. In some existing data centers, services for providing network content using HTTP and a proprietary service for providing on-demand video have been co-located on the same devices. In those systems, an administrator would manually set the capacity allocations between the services at a PoP.

Generally described, some aspects of the present disclosure are directed to co-locating streaming egress services and content delivery services in a CDN on the same computing devices in the same PoPs. The content streaming service may largely be agnostic to a routing and capacity management system while the routing and capacity management system routes and shapes network traffic in a manner that facilitates the co-located services. A client application on a client computing device can request content from a content streaming service. A control plane of the content streaming service can request a suitable PoP for the client request from a routing and capacity management system. The routing and capacity management system can process logs from the services to monitor resource usage at respective PoPs and/or border links. The routing and capacity management system can respond to the streaming control plane and identify a suitable PoP based on the monitored resource usage of the PoPs and/or border links. Moreover, based on the monitored resource usage, the routing and capacity management system can instruct the streaming control plane to limit the load associated with one or more clients served by a PoP, which may cause the clients to reconnect to the content streaming service thereby re-routing traffic and rebalancing computing resource usage.

Generally described, some aspects of the present disclosure are directed to dynamically determining capacity allocations for multiple services on the same computing devices in the same PoPs. A routing and capacity management system may receive logs associated with the services. The routing and capacity management system can process logs from the services to generate data that reflects resource usage at respective PoPs and/or border links. The routing and capacity management system can dynamically determine capacity allocations for the services based on the generated data and instruct the services with the capacity allocation changes.

The solutions described herein can advantageously lay out the modifications to a content streaming service to operate efficiently on hardware shared with a CDN. The modifications can be optionally turned off or on and the content streaming service can still operate in environments without shared hardware. Accordingly, the changes described herein can be relatively minimal, such as having as few integration points as possible and/or transmitting as little data as possible between the content streaming service and a routing and capacity management system but still benefit from the integration of the components to control and manage network traffic.

As described above, some existing systems may not be configured to co-locate streaming egress services and content delivery services in a CDN on the same computing devices in the same PoPs. If there is a large streaming demand for a PoP then that can result in a greater usage and demand on the central processing units (CPUs) in the PoP. There can also be set quotas of capacity usage at the border links between the CDN and Internet Service Providers (ISPs). If there is a large streaming demand on certain PoPs then that can result in a greater usage at the border links. Therefore, co-locating streaming egress services and content delivery services in a CDN can present one or more technical challenges in the computer networking technology area.

The systems and methods described herein may improve computer networking technology. The solutions described herein can advantageously specify what changes, such as application programming interfaces, can be added to a content streaming service that enable the content streaming service to be integrated with a routing and capacity management system. The routing and capacity management system can route traffic to particular PoPs based on analysis of client usage logs from the streaming egress services. Moreover, the routing and capacity management system can communicate with a streaming control plane that instructs the content streaming service to limit the load associated with one or more clients served by a PoP, which may include evicting those clients and causing the clients to reconnect to the content streaming service. The routing and capacity management system can manage and redistribute the load on the PoPs (which affects CPU utilization) and/or the load on the border links. Thus, the systems and methods described herein can improve the functioning of computing devices. Moreover, the systems and methods described herein can improve over existing computer networking techniques, such as improving over techniques for network load-balancing in content streaming.

As described above, some existing systems had services for different protocols co-located at the same PoP. However, in those systems, an administrator would manually set the capacity allocations between the services at a PoP. The systems and methods described herein may improve computer networking technology via dynamic resource allocation. As described herein, the routing and capacity management system can dynamically manage and redistribute capacity allocations between the services at the PoPs and/or the border links, which can be an improvement over existing solutions. Moreover, the systems and methods described herein dynamically change the capacity allocations of co-located services, which can improve the functioning of computing devices.

As used herein, a "capacity unit" can refer to a standardized unit of capacity usage at a PoP. A capacity unit can be calculated differently based on how an associated service affects the computing resources of the PoP where the service is executing. For a content delivery service, such as a service that provides network content over HTTP, a capacity unit can be calculated based on a linear equation, such as: A*requests per second (RPS)+B*data rate (such as bits or bytes per second). The coefficients of the linear equation, such as A and B, can be determined using a model, such as a linear regression model. The capacity usage for a streaming egress service, such as a service that streams content over UDP, can be correlated with the service's streamed bandwidth. Thus, a capacity unit can be calculated based on an equation, such as A*data rate.

As used herein, "load" for a PoP or a border link can refer to the capacity units (or other measurement such as a request rate or data rate) being served by the PoP or border link at a particular time. If a PoP or border link is serving one hundred million capacity units for a content delivery service and one hundred million capacity units for a streaming egress service, then the PoP or border link can be serving two hundred million capacity units at that particular time.

As used herein, "demand" for a PoP can refer to the capacity units that a particular PoP would serve based on preferred criteria (such as latency or proximity) regardless of the capacity usage of the particular PoP. Similarly, as used herein, "demand" for a border link can refer to the capacity units that would egress through a particular border link based on preferred criteria (such as latency or proximity) regardless of the capacity usage of the particular border link.

Turning to FIG. 1, an illustrative network environment 100 is shown. The network environment 100 may include one or more client computing devices 102, a routing and capacity management system 110, a streaming control plane 120, and a CDN 130. The CDN 130 includes PoPs 132A, 132B. The PoPs 132A, 132B can include servers 134A, 134B. The constituents of the network environment 100 may be in communication with each other either locally or over a network 103. As used herein, a "point of presence (PoP)" can refer to collection of devices, such as servers, routers, and/or switches that collectively reflect a demarcation point between two or more networks.

Example client computing devices 102 can include, but are not limited to, a laptop or tablet computer, personal computer, personal digital assistant (PDA), hybrid PDA/mobile phone, smart wearable device (such as a smart watch), mobile phone, a smartphone, set-top or other television box, television or smart television, and/or video-game console or other gaming device. A user can use a client application on the client computing device 102, such as a media player application or a web browser application. The client computing device 102 can communicate with the streaming control plane 120. A client application on the client computing device 102 can request, from the streaming control plane 120, a server from which to stream data. The streaming control plane 120 can select a server 134A, 134B with a streaming egress service 104A, 104B for streaming data to the client computing device 102. The client application on the client computing device 102 can receive streaming data from a server 134A, 134B in the PoP 132A, 132B executing a streaming egress service 104A, 104B. The same or other client computing devices 102 can receive other data from the other service(s) 106A, 106B executing in the PoP 132A, 132B, such as HTTP data.

The routing and capacity management system 110 can communicate with the servers 134A, 134B in the PoPs 132A, 132B. The streaming egress services 104A, 104B can provide client usage logs, such as the speed of transmission (such as bits per second) for each client (which can be identified by Internet Protocol (IP) address). The routing and capacity management system 110 can communicate with the streaming control plane 120. The routing and capacity management system 110 can use the log data and possibly additional or alternative information to respond to requests from the streaming control plane regarding the PoPs that should be assigned to service particular client requests. The routing and capacity management system 110 can use the log data and possibly additional or alternative information to identify which clients should be limited, which can include the streaming control plane 120 causing certain client computing devices 102 to be evicted and forcing the client computing devices 102 to reconnect to possibly different PoPs. The routing and capacity management system 110 can use the log data and possibly additional or alternative information to dynamically determine a ratio of capacity allocation for respective co-located services 104A, 106A executing on the server 134A. In some embodiments, the routing and capacity management system 110 can assign the same capacity allocation for respective service types on all the servers 134A at a PoP 132A (such as all streaming egress services 104A being assigned the same first capacity allocation and all the other services 106A of the same type being assigned the same second capacity allocation).

The network 103 may be any wired network, wireless network, or combination thereof. In addition, the network 103 may be a personal area network, local area network, wide area network, cable network, satellite network, cellular telephone network, or combination thereof. In addition, the network 103 may be an over-the-air broadcast network (e.g., for radio or television) or a publicly accessible network of linked networks, possibly operated by various distinct parties, such as the Internet. In some embodiments, the network 103 may be a private or semi-private network, such as a corporate or university intranet. The network 103 may include one or more wireless networks, such as a Global System for Mobile Communications (GSM) network, a Code Division Multiple Access (CDMA) network, a Long-Term Evolution (LTE) network, or any other type of wireless network. The network 103 can use protocols and components for communicating via the Internet or any of the other aforementioned types of networks, such as HTTP, TCP/IP, and/or UDP/IP.

The client computing devices 102, the routing and capacity management system 110, the streaming control plane 120, and the CDN 130 may each be embodied in a plurality of devices. The client computing devices 102 and components of the routing and capacity management system 110, the streaming control plane 120, and the CDN 130 may each include a network interface, memory, hardware processor, and non-transitory computer-readable medium drive, all of which may communicate with each other by way of a communication bus. The network interface may provide connectivity over the network 103 and/or other networks or computer systems. The hardware processor may communicate to and from memory containing program instructions that the hardware processor executes in order to operate the client computing devices 102 and components of the routing and capacity management system 110, the streaming control plane 120, and the CDN 130. The memory generally includes RAM, ROM, and/or other persistent and/or auxiliary non-transitory computer readable storage media.

Additionally, in some embodiments, the routing and capacity management system 110, the streaming control plane 120, and the CDN 130 or components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "serverless," "cloud," or distributed computing environment.

Figure 2:
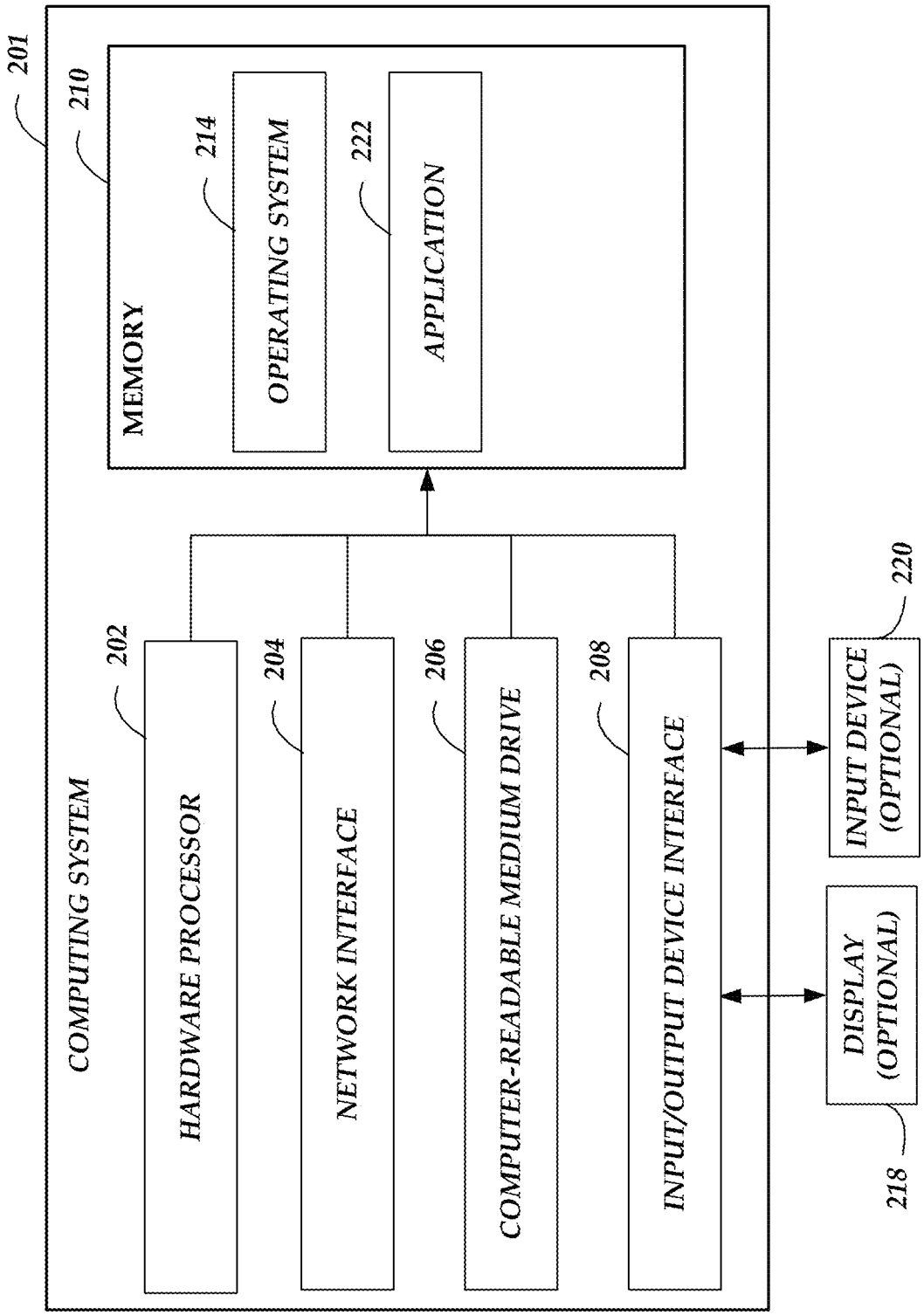
FIG. 2 is a schematic diagram depicting an illustrative general architecture of a computing system for implementing one or more devices referenced in the network environment depicted in FIG. 1.
Figure 4:
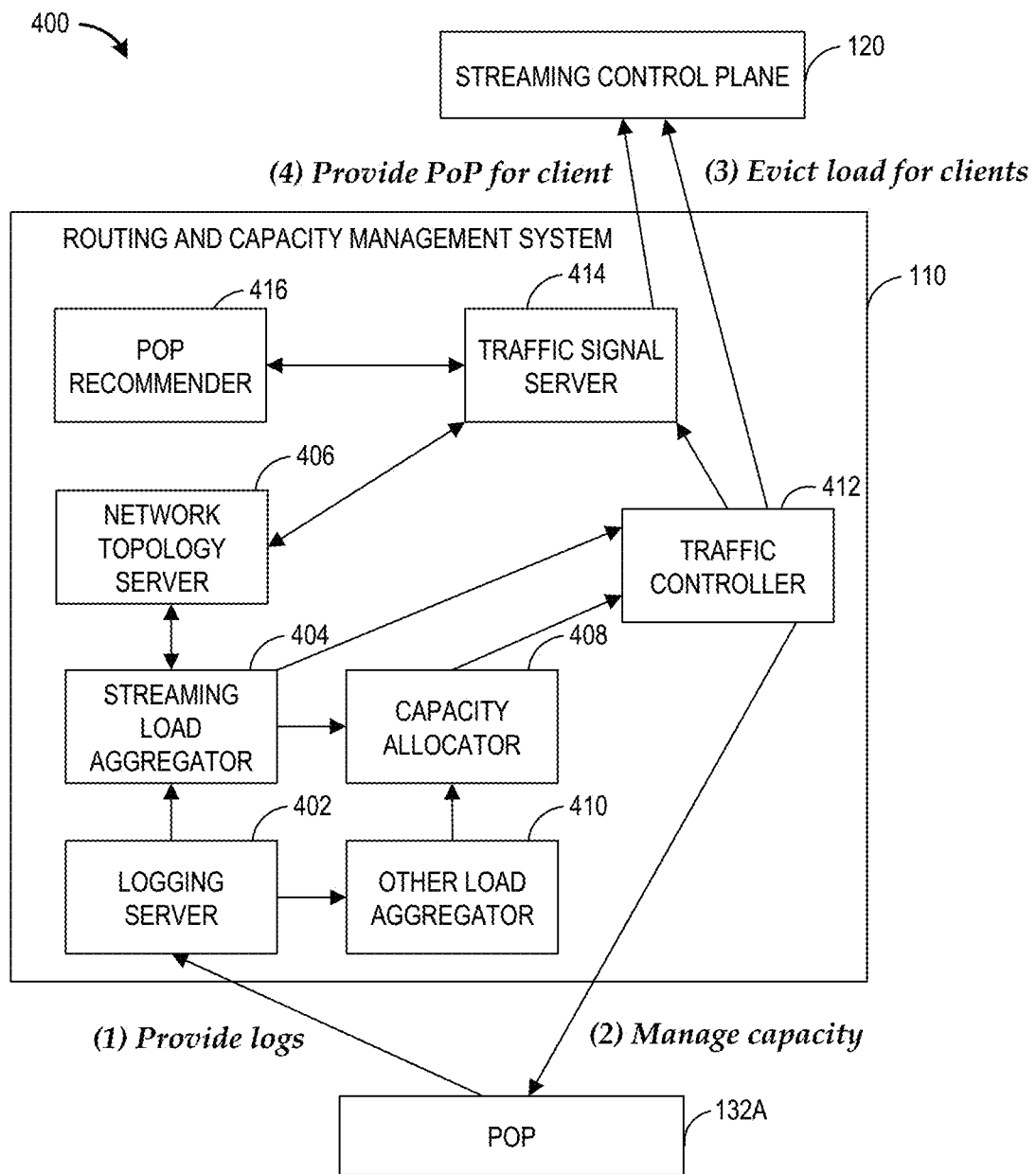
FIG. 4 is another flow diagram depicting illustrative interactions for routing and managing capacity in a computer network.

FIG. 2 is a schematic diagram of an illustrative general architecture of a computing system 201 for implementing a computing device within the routing and capacity management system 110 referenced in the environment 100, 400 in FIGS. 1 and 4. The computing system 201 includes an arrangement of computer hardware and software components that may be used to execute the application 222. While the general architecture of the computing system 201 is shown and described with respect to FIG. 2, the general architecture of FIG. 2 can be used to implement other devices described herein, such as a server 134A, 134B within a PoP 132A, 132B, the streaming control plane 120, a client computing device 102 referenced in FIG. 1. The computing system 201 may include more (or fewer) components than those shown in FIG. 2. Further, other computing systems described herein may include similar implementation arrangements of computer hardware and/or software components.

The computing system 201 for implementing a device within the routing and capacity management system 110 may include a hardware processor 202, a network interface 204, a non-transitory computer-readable medium drive 206, and an input/output device interface 208, all of which may communicate with one another by way of a communication bus. As illustrated, the computing system 201 is associated with, or in communication with, an optional display 218 and an optional input device 220. The network interface 204 may provide the computing system 201 with connectivity to one or more networks or computing systems. The hardware processor 202 may thus receive information and instructions from other computing systems or services via the network 103. The hardware processor 202 may also communicate to and from memory 210 and further provide output information for an optional display 218 via the input/output device interface 208. The input/output device interface 208 may accept input from the optional input device 220, such as a keyboard, mouse, digital pen, and/or touch screen. The input/output device interface 208 may also output audio data to speakers or headphones (not shown).

The memory 210 may contain specifically configured computer program instructions that the hardware processor 202 executes in order to implement one or more embodiments of a device within the routing and capacity management system 110. The memory 210 generally includes RAM, ROM and/or other persistent or non-transitory computer-readable storage media. The memory 210 may store an operating system 214 that provides computer program instructions for use by the hardware processor 202 in the general administration and operation of the device within the routing and capacity management system 110.

The memory 210 may include an application 222 that may be executed by the hardware processor 202. In some embodiments, the application 222 may implement various aspects of the present disclosure. In some embodiments, the application 222 can process client usage logs and aggregate data for use by the routing and capacity management system 110. In some embodiments, the application 222 can make routing decisions and indicate which PoPs should service which requests based on the aggregated data. In some embodiments, the application 222 can evict clients based on the aggregated data. In some embodiments, the application 222 can cause the capacity allocation for one or more services at the PoPs to change based on the aggregated data.

Figure 3:
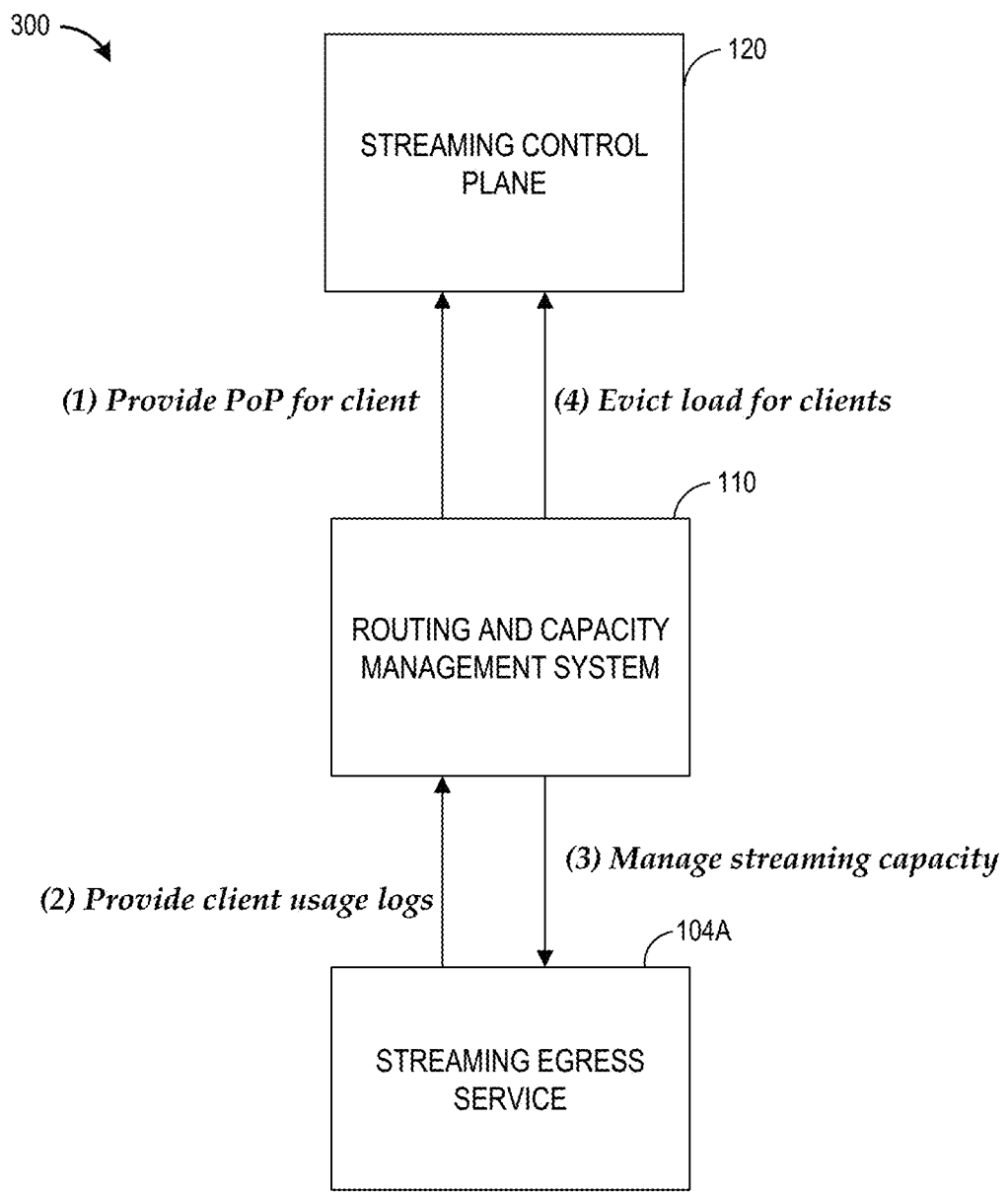
FIG. 3 is a flow diagram depicting illustrative interactions for routing and managing capacity in a computer network.

With reference to FIG. 3, illustrative interactions are depicted for routing and managing capacity allocation in a computer network. The environment 300 of FIG. 3 can be similar to the environment 100 of FIG. 1. Some or all of depicted interactions in FIG. 3 may be optional depending on the circumstances or embodiment. Each of the communication links in the network environment 300 can represent an API communications point.

The interactions of FIG. 3 begin at step one (1) where the routing and capacity management system 110 can provide a PoP for a client to the streaming control plane 120. The routing and capacity management system 110 can provide the PoP in response to a request from the streaming control plane 120. While not shown, in some embodiments, an application (such as a media player application) on the client computing device 102 requests, from the streaming control plane 120, a streaming source. As described herein, the routing and capacity management system 110 can select a PoP for the client based on one or more factors, such as geographic proximity, latency, and/or current capacity or status of the available PoPs. In some embodiments, the routing and capacity management system 110 provides the identified PoP to the streaming control plane 120. The streaming control plane 120 can provide the PoP (such as an IP address of the PoP) to the client application, which can receive streaming content (such as UDP packets) from a streaming egress service 104A hosted in the PoP.

In some embodiments, the routing and capacity management system 110 can provide a set of PoPs to the streaming control plane 120. In some embodiments, the set can be an ordered set, with the PoPs in order of preference. The ordered PoPs can be ordered based on estimated latency for a particular client IP address. In some embodiments, the streaming control plane 120 can iterate over the set until a streaming egress service 104A at one of the PoPs with sufficient available capacity is located. The streaming control plane 120 can provide a corresponding IP address to an application on the client computing device 102.

At step two (2), the streaming egress service 104A can provide client usage logs to the routing and capacity management system 110. In some embodiments, the client usage logs can include a list of clients (such as an IP address for each client computing device 102) and the recorded bandwidth (such as a bit or byte rate) for each client (such as client 1 at five megabits per second, client 2 at 2 megabits per second, etc.). In some embodiments each streaming egress service 104A can provide a client usage log at a particular frequency, such as once per minute or every ten minutes. As described herein, the routing and capacity management system 110 can generate aggregated data based on the client usage logs to make routing and capacity management decisions.

At step three (3), the routing and capacity management system 110 can manage a capacity allocation for the streaming egress service 104A. The routing and capacity management system 110 can decide to increase or decrease the streaming capacity allocation at each PoP. As depicted, the routing and capacity management system 110 can communicate with the streaming egress service 104A at a PoP. In some embodiments, the routing and capacity management system 110 sets a streaming capacity allocation value and each streaming egress service 104A within a PoP can be limited to the streaming capacity allocation value (such as a value in bits per second). As described herein, the routing and capacity management system 110 can determine the streaming capacity allocation value based at least on aggregated data and the client usage logs. Also as described herein, streaming capacity allocation can be a proxy for CPU usage. The routing and capacity management system 110 can map a streaming capacity allocation value to an amount of CPU as an approximation for controlling the CPU usage of computing devices in a PoP with streaming egress services 104A.

At step four (4), the routing and capacity management system 110 can evict load associated with one or more clients by communicating with the streaming control plane 120. In some embodiments, the routing and capacity management system 110 can instruct the streaming control plane 120 (such as by sending an eviction message) that the load for a set of clients (such as the clients at specific IP prefix(es)) should not exceed a particular data rate. As described herein, the routing and capacity management system 110 can determine eviction load for particular clients based at least on aggregated data and the client usage logs. In some cases, the streaming control plane 120 can instruct particular clients to disconnect, which can cause those clients to reconnect thereby causing step one (1) to repeat. When step one (1) repeats, it is possible that the routing and capacity management system 110 will route the client to a different PoP based on the one or more factors described herein. Since streaming can be a bandwidth heavy activity and particular clients can use more bandwidth than others, step four (4) can advantageously allow the routing and capacity management system 110 to finely manage link utilization by targeting specific clients that are heavy bandwidth users and avoiding penalizing all clients connected to a particular PoP. The routing and capacity management system 110 can also alleviate border link congestion by evicting those clients with heavy bandwidth usage.

With reference to FIG. 4, illustrative interactions are depicted for routing and managing capacity in a computer network. The environment 400 of FIG. 4 can be similar to the environment 100 of FIG. 1. Some or all of depicted interactions in FIG. 4 may be optional depending on the circumstances or embodiment. The depicted interactions in FIG. 4 may be similar to the depicted interactions in FIG. 3. However, the depicted interactions in FIG. 4 may be discussed in a different order than the depicted interactions in FIG. 3. In some embodiments, not every possible communication link may be depicted in FIG. 4, such as a communication link (not illustrated) between the network topology server 406 and the capacity allocator 408.

At step one (1), computing devices within a PoP 132A can provide logs to a logging server 402 in the routing and capacity management system 110. The format and data within the log can vary depending on the service in the PoP 132A that provides the log. As described herein, in some embodiments, a streaming egress service 104A can provide client usage logs that include a list of clients (such as an IP address for each client computing device 102) and the recorded bandwidth (such as bits per second) for each client (such as client 1 at five megabits per second, client 2 at 2 megabits per second, etc.). In some embodiments, another service 106A (such as a content delivery service) can provide logs that are grouped by Domain Name System (DNS) resolver and that include a request rate (such as RPS) and data rate (such as bits or bytes per second) for each resolver. In some embodiments, each service 104A, 106A can provide a log at a particular frequency, such as once per minute or every ten minutes.

The streaming load aggregator 404 in the routing and capacity management system 110 can generate aggregated data based on the client usage logs received from the logging server 402. The streaming load aggregator 404 can receive network topology metadata from the network topology server 406. The network topology metadata can include mapping entries. Each mapping entry can include a network prefix (such as an IP prefix), a PoP, and a border link. In some embodiments, given a client IP address (or IP prefix) and a PoP, the network topology server 406 can indicate the egress border link for that input. In some embodiments, the network topology metadata can include a respective capacity threshold value for each border link in the mapping entries. The aggregated data output from the streaming load aggregator 404 can indicate a recorded bandwidth per IP prefix for each border link and PoP. In some embodiments, the output aggregated data from the streaming load aggregator 404 can also indicate a total recorded bandwidth for each border link and PoP. In some embodiments, the aggregated data can indicate the aggregated load a content streaming service is placing on a PoP and/or the aggregated load the content streaming service is placing on a border link.

The other load aggregator 410 in the routing and capacity management system 110 can generate aggregated data based on logs from other services (such as a log from a content delivery service) received from the logging server 402. The other load aggregator 410 can combine the logs with the resolver data to generate aggregated data. The aggregated data of the other load aggregator 410 can include the Domain Name System (DNS) resolver associated with a request rate (such as RPS) and data rate (such as bits or bytes per second) for each resolver. The other load aggregator 410 can also receive a list of PoPs for each resolver, which can be ordered in decreasing order of latency or other criteria.

The capacity allocator 408 in the routing and capacity management system 110 can receive the aggregated data from the aggregators 404, 410 and dynamically determine capacity allocations for the co-located services in a PoP. In some embodiments, the capacity allocator 408 can use aggregated data based on logs from content streaming and content delivery services. In some embodiments, based on demand and/or load, the capacity allocator 408 can dynamically allocate capacity between services (such as a first capacity allocation for a streaming egress service and a second capacity allocation for a content delivery service) at a PoP and/or using a border link. The PoP recommender 416 can provide an ordered list of PoPs for each resolver, which can be ordered in decreasing order of latency or other criteria The PoP recommender 416 can provided ordered list of PoPs for each IP prefix, which can be ordered in decreasing order of latency or other criteria. In some embodiments, the capacity allocator 408 can calculate the total demand for some services at each PoP by selecting the first in-service PoP in the list for each resolver entry and combining the capacity units calculated from the request and data rates in the log data for each resolver. The capacity allocator 408 can calculate the total demand for other services at each PoP by selecting the first in-service PoP in the list for each IP prefix and combining the capacity units calculated from data rates in the log data for each IP prefix.

At step two (2), the traffic controller 412 in the routing and capacity management system 110 can manage capacity allocations for the services at a PoP 132A. The traffic controller 412 can decide to increase or decrease the capacity allocation for services at each PoP. In some embodiments, the traffic controller 412 can receive the aggregated data and determine the PoPs and/or border links that are out of capacity. In some embodiments, the traffic controller 412 can adjust the capacity allocation(s) for one or more services at a PoP 132A based on the output from the capacity allocator 408. In some embodiments, the traffic controller 412 can compare the capacity allocation received from the capacity allocator 408 and compare it to the load from the streaming load aggregator 404.

At step three (3), the traffic controller 412 in the routing and capacity management system 110 can evict load associated with one or more clients by communicating with the streaming control plane 120. As described herein, the traffic controller 412 can determine the border links that are out of capacity. In that case, the traffic controller 412 can instruct the streaming control plane 120 (such as by sending an eviction message) that the load for a set of clients (such as the clients at specific IP prefix(es)) associated with those border links should not exceed a particular data rate. As described herein, the traffic controller 412 can determine the load for particular clients based at least on aggregated data and output from the capacity allocator 408. In some cases, the streaming control plane 120 can instruct particular clients to disconnect, which can cause those clients to reconnect thereby causing step four (4) to repeat.

At step four (4) the traffic signal server 414 in the routing and capacity management system 110 can provide a PoP for a client to the streaming control plane 120. The traffic signal server 414 can provide the PoP in response to a request from the streaming control plane 120. As described herein, the traffic signal server 414 can select a PoP for the client based on one or more factors, such as geographic proximity, latency, and/or current available capacity or status of the available PoPs. For a particular client IP address, IP prefix, or resolver, the PoP recommender 416 can provide an ordered list of PoPs, which can be sorted based on the aforementioned criteria. The traffic signal server 414 can use the data from the PoP recommender 416 and data from the traffic controller 412 to remove PoPs that are either out of capacity or that are out of service. In some embodiments, the routing and capacity management system 110 provides the identified PoP (or list of PoPs) to the streaming control plane 120. The streaming control plane 120 can provide a selected PoP (such as an IP address of the PoP) to the client application, which can receive streaming content (such as UDP packets) from a streaming egress service hosted in the PoP 132A.

Figure 5:
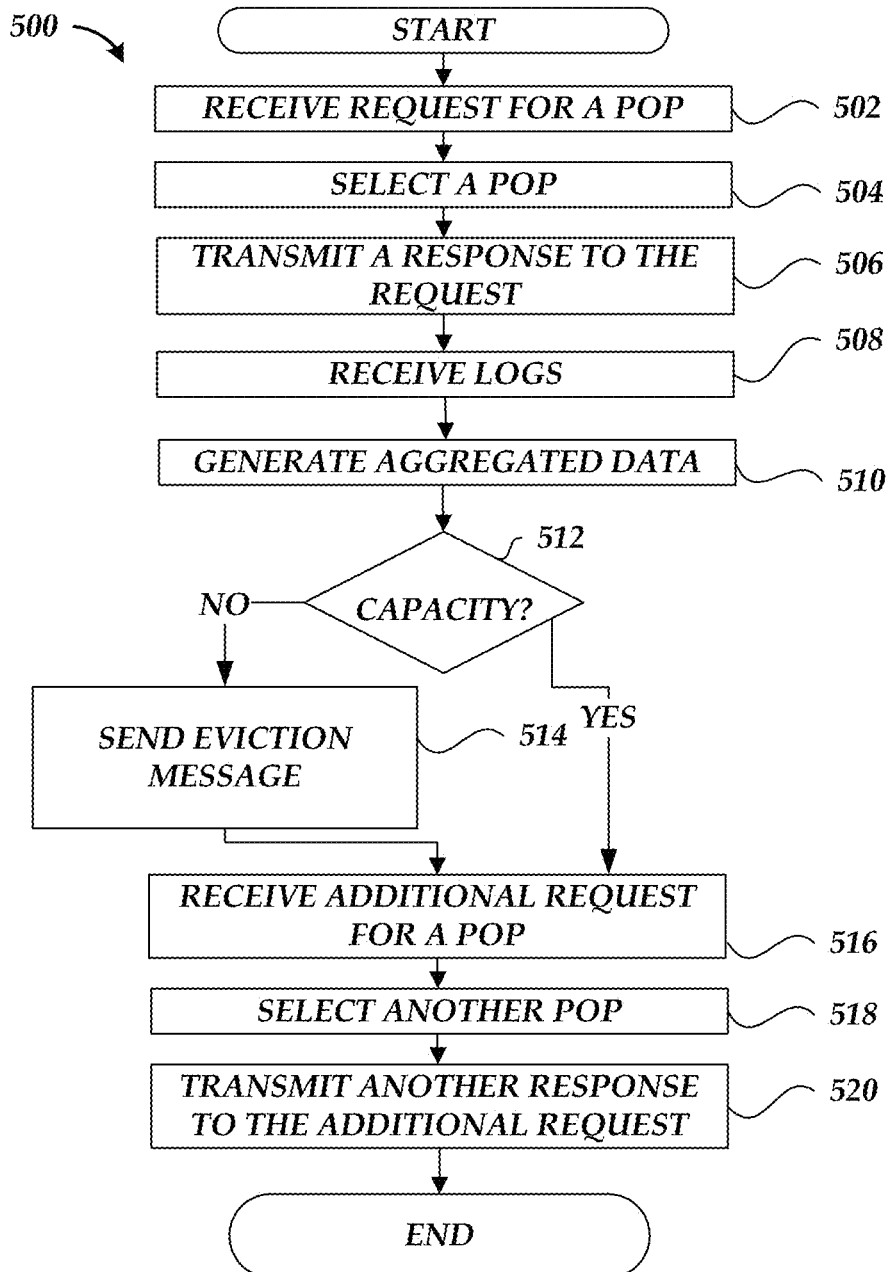
FIG. 5 is a flow diagram depicting a method for routing and managing capacity in a computer network.

FIG. 5 is a flow diagram depicting a method 500 implemented by the routing and capacity management system 110 for routing and managing capacity in a computer network. As described herein, the routing and capacity management system 110 may include a traffic controller 412 and a traffic signal server 414. In some embodiments, the traffic controller 412 and the traffic signal server 414 may implement aspects of the method 500. Some aspects of the method 500 may be implemented by other components of the routing and capacity management system 110, such as the logging server 402, the streaming load aggregator 404, the other load aggregator 410, the capacity allocator 408, and/or the PoP recommender 416. Moreover, some aspects of the method 500 may be described above with respect to FIGS. 3 and 4.

Beginning at block 502, a request for a PoP can be received. A client computing device 102 can request a PoP to receive streaming data. The streaming control plane 120 can receive the request from the client computing device 102. The streaming control plane 120 can subsequently request a PoP for the client computing device 102 from the routing and capacity management system 110. The request can include a client IP address for the client computing device 102.

At block 504, a PoP can be selected. The traffic signal server 414 can select a PoP from several PoPs. In some embodiments, the PoP recommender 416 can provide a list of PoPs to the traffic signal server 414 based on the client IP address in the received request. As described herein, the traffic signal server 414 can select a PoP for the client based on one or more factors, such as geographic proximity, latency, and/or current available capacity or status of the available PoPs. For a particular client IP address, or IP prefix, the PoP recommender 416 can provide an ordered list of PoPs, which can be sorted based on the aforementioned criteria. The traffic signal server 414 can use the data from the PoP recommender 416 and data from the traffic controller 412 to remove PoPs that are either out of capacity or that are out of service. In some embodiments, the traffic signal server 414 can identify a subset of PoPs for the client IP address. The traffic signal server 414 can order the subset of PoPs based on one or more factors (such as the estimated latency with the client IP address).

At block 506, a response to the request can be transmitted. In some embodiments, the traffic signal server 414 transmits a response to the request. The response can include an identifier (or set of identifiers, which can be ordered) associated with the identified PoP(s). As described herein, in some embodiments, the streaming control plane 120 can iterate over the set until a streaming egress service 104A at one of the PoPs with sufficient available capacity is located. The streaming control plane 120 can provide a corresponding IP address to an application on the client computing device 102.

At block 508, logs can be received. In some embodiments, the logging server 402 can receive logs from a PoP 132A. The logging server 402 can receive a client usage log from a streaming egress service 104A executing at a PoP 132A. A client usage log can include recorded bandwidths for client IP addresses. The format and data within the log can vary depending on the service in the PoP 132A that provides the log. Another service 106A (such as a content delivery service) can provide logs that are grouped by Domain Name System (DNS) resolver and that include a request rate (such as RPS) and data rate (such as bits or bytes per second) for each resolver. The service 104A, 106A can transmit the logs based on a frequency. As described herein, the services 104A, 106A can be co-located at a PoP. As described herein, a streaming egress service 104A can be configured to transmit network packets over UDP and another network service 106A can be configured to transmit network packets over TCP. The streaming egress service 104A can be configured to transmit network packets substantially in real time with an event.

At block 510, aggregated data can be generated. An aggregator 404, 410 can generate aggregated data from logs from the logging server 402. In some embodiments, a streaming load aggregator 404 can generate aggregated data indicating at least a first load value at a first border link using the client usage logs. The network topology server 406 can receive network topology metadata. The network topology metadata can include mapping entries where each mapping entry includes an IP prefix, a PoP, and a border link. The network topology metadata can also include a respective capacity threshold value for each border link in the mapping entries. The streaming load aggregator 404 can calculate, from the client usage logs and the network topology metadata, a load value at the border link. The streaming load aggregator 404 can perform the calculation by combining recorded bandwidths that are associated with the same border link. The aggregated data output from the streaming load aggregator 404 can indicate a recorded bandwidth per IP prefix for each border link and PoP. In some embodiments, the output aggregated data from the streaming load aggregator 404 can also indicate a total recorded bandwidth for each border link and PoP. As described herein, the routing and capacity management system 110 can use the aggregated data to determine the aggregated load that a streaming content service is placing on a PoP, which can be used to determine if the capacity allocation for the streaming content service should be increased or decreased. Moreover, the routing and capacity management system 110 can use the aggregated data to determine whether the load by a service on a PoP is equal to its capacity allocation and further decide to stop sending more clients to the PoP.

In some embodiments, another load aggregator 410 can generate aggregated data based on logs from other services (such as a log from a content delivery service that transmits data via HTTP) received from the logging server 402. The other load aggregator 410 can receive a list of PoPs for each resolver, which can be ordered in decreasing order of latency or other criteria. In some embodiments, the other load aggregator 410 can calculate the total demand for each PoP by selecting the first in-service PoP in the list for each resolver entry and combining the capacity units calculated from the request and data rates in the log data for each resolver.

At block 512, it can be determined whether capacity has been exceeded. The traffic controller 412 can determine, from the aggregated data, that a load value at a border link is at or above a capacity threshold value. In some embodiments, the traffic controller 412 can determine, from the aggregated data, that a load value at a PoP is at or above a capacity threshold value. As described herein, the capacity allocator 408 can generate the capacity allocation values for border links and/or PoPs. If the method 500 determines that there is insufficient capacity, the method 500 can proceed to block 514 for sending an eviction message. If the method 500 determines that there is sufficient capacity, the method 500 can proceed to block 516 for receiving additional requests.

At block 514, an eviction message can be sent. In some embodiments, the traffic controller 412 can transmit an eviction message to the streaming control plane 120. The traffic controller 412 can identify a range of client IP addresses associated with high bandwidth usage at the first border link. The traffic controller 412 can identify, from the network topology metadata, the range of client IP addresses from an IP prefix associated with a border link. The eviction message can include a client IP address or the range of client IP addresses for possible eviction from a PoP. The eviction message can further include an identifier for a PoP and/or an eviction threshold value. As described herein, by sending the eviction message, the traffic controller 412 can cause network traffic to be directed away from a PoP and/or border link.

In some embodiments, the streaming control plane 120 can receive the eviction message. The streaming control plane 120 can identify, from the range of client IP addresses in the eviction message, a client IP address of a client computing device 102 in communication with a streaming egress service. The streaming control plane 120 can calculate a total bandwidth value associated with one or more streaming clients associated with the range of client IP addresses. The streaming control plane 120 can determine that the total bandwidth value is at or above the eviction threshold value. The streaming control plane 120 can identify a client IP address within the range of client IP addresses. The streaming control plane 120 can transmit a message configured to cause the client computing device 102 at the client IP address to disconnect from a particular streaming egress service. As described herein, after disconnecting from the particular streaming egress service, the client computing device 102 can request a new streaming egress service from the streaming control plane 120, which can thereby end up directing the client computing device 102 to a new PoP in some cases.

In some embodiments, the streaming control plane 120 can communicate with multiple streaming egress services 104A, 104B. The streaming control plane 120 can request the streaming egress services 104A, 104B to provide a bandwidth amount that each service 104A, 104B is streaming to a particular client IP address or range of client IP addresses. The streaming control plane 120 can then calculate the total bandwidth value associated with one or more streaming clients associated with the range of client IP addresses.

At block 516, an additional request for a PoP can be received. The block 516 for receiving a request for another PoP can be similar to the previous block 502 for receiving a PoP. Another client computing device 102 can request a PoP to receive streaming data. The streaming control plane 120 can receive the additional request from a client computing device 102. The streaming control plane 120 can subsequently request another PoP for the client computing device 102 from the routing and capacity management system 110. The additional request can include a client IP address for the client computing device 102.

At block 518, another PoP can be selected. The block 518 for selecting another PoP can be similar to the previous block 504 for selecting a PoP. However, the traffic signal server 414 and/or the traffic controller 412 can use additional information such as aggregated data from the aggregator(s) and/or determined capacity allocation from the capacity allocator 408 to select a PoP. The traffic signal server 414 and/or the traffic controller 412 can avoid PoPs that are out of capacity and/or PoPs associated with border links that are out of capacity. The traffic signal server 414 and/or the traffic controller 412 can also avoid PoPs that are out of service. In response to the request for a PoP, the traffic signal server 414 can select one or more PoPs taking into consideration the PoPs that are out of service or out of capacity. The traffic signal server 414 and/or the traffic controller 412, can determine from the network topology metadata, that a PoP is associated with a particular border link, which can be above or at capacity. The traffic signal server 414 can select, from the known PoPs, a different PoP that has capacity instead of the PoP that is out of capacity. As described herein, by selecting a different PoP, the traffic signal server 414 can cause network traffic to be directed away from a PoP and/or border link.

At block 520, another response to the additional request can be transmitted. The block 520 for transmitting another response can be similar to the previous block 506 for transmitting a response. In some embodiments, the traffic signal server 414 transmits another response to the additional request. As described herein, logs can be received periodically and updated over time. Accordingly, the behavior of the routing and capacity management system 110 can change over time based on the aggregated data and/or determined capacities that can change based on the updated logs.

Figure 6:
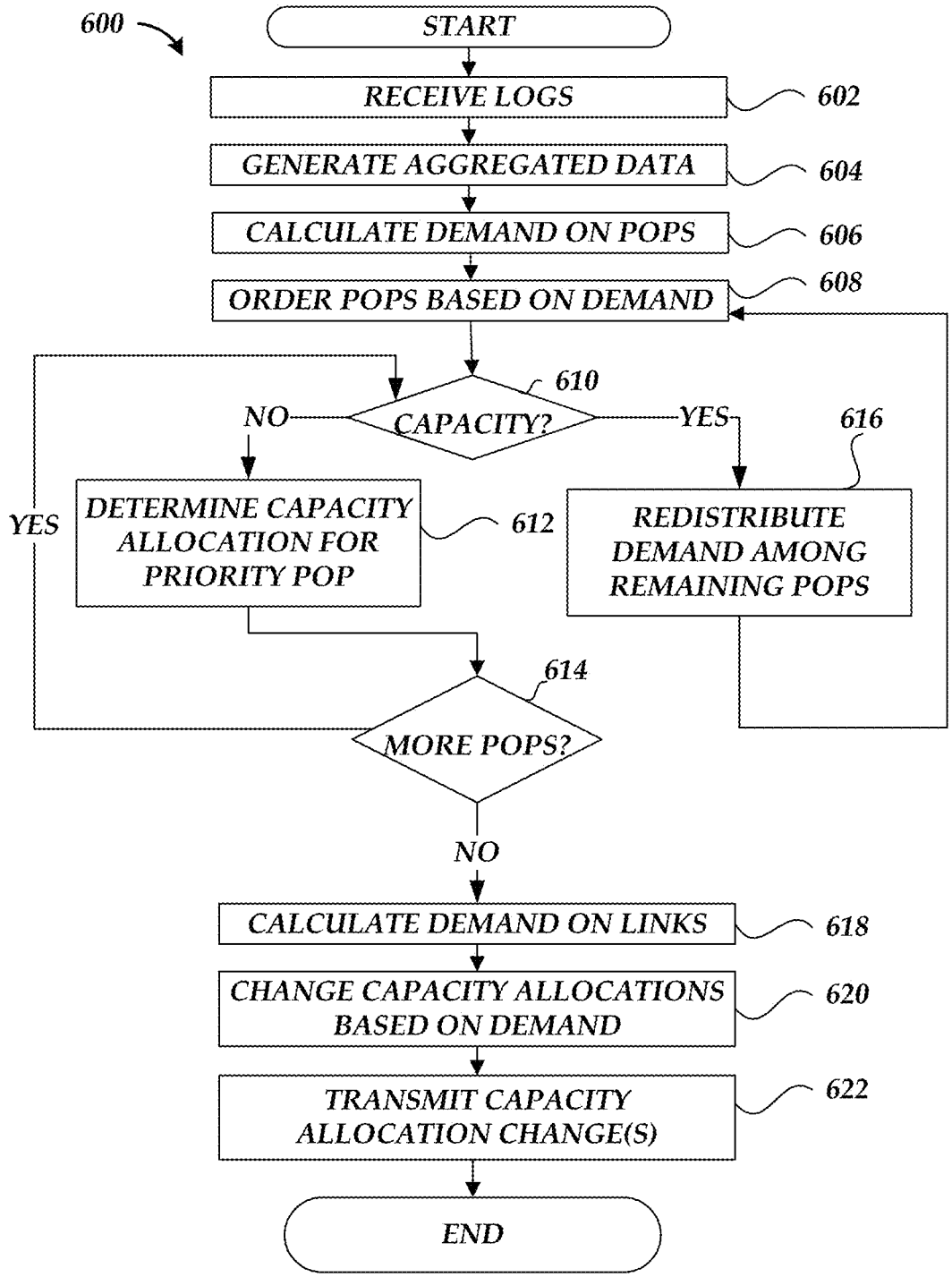
FIG. 6 is a flow diagram depicting a method for dynamically allocating capacity in a computer network.

FIG. 6 is a flow diagram depicting a method 600 implemented by the routing and capacity management system 110 for dynamically allocating capacity in a computer network. As described herein, the routing and capacity management system 110 may include a capacity allocator 408 and a traffic controller 412. In some embodiments, the capacity allocator 408 and a traffic controller 412 may implement aspects of the method 600. Some aspects of the method 600 may be implemented by other components of the routing and capacity management system 110, such as the logging server 402, the streaming load aggregator 404, the other load aggregator 410, and/or the PoP recommender 416. Moreover, some aspects of the method 600 may be described above with respect to FIGS. 3, 4, and 5.

Beginning at block 602, logs can be received. The block 602 of FIG. 6 for receiving logs can be similar to block 502 of FIG. 5 for receiving logs. As described herein, the logging server 402 can receive logs from a PoP 132A. The logging server 402 can receive a client usage log from a streaming egress service 104A executing at a PoP 132A. A client usage log can include recorded bandwidths for client IP addresses. In some embodiments, another service 106A (such as a content delivery service) can provide logs that are grouped by Domain Name System (DNS) resolver and that include a request rate (such as RPS) and data rate (such as bits or bytes per second) for each resolver. As described herein, the PoP 132A can include a computing device that is executing multiple services 104A, 16A, such as a streaming egress service and a content delivery service.

At block 604, aggregated data can be generated. The block 604 of FIG. 6 for generating aggregated data can be similar to block 506 of FIG. 5 for generating aggregated data. A streaming load aggregator 404 can generate aggregated data indicating at least a first load value at a first border link using the client usage logs. The network topology server 406 can receive network topology metadata. The network topology metadata can include mapping entries where each mapping entry includes an IP prefix, a PoP, and a border link. The network topology metadata can also include a respective capacity threshold value for each border link in the mapping entries. The streaming load aggregator 404 can calculate, from the client usage logs and the network topology metadata, a load value at the border link. The streaming load aggregator 404 can perform the calculation by combining recorded bandwidths that are associated with the same border link. The aggregated data output from the streaming load aggregator 404 can indicate a recorded bandwidth per IP prefix for each border link and PoP. The aggregated data output from the streaming load aggregator 404 can include entries where each entry is at least a pair of an IP prefix and a recorded bandwidth. In some embodiments, the output aggregated data from the streaming load aggregator 404 can also indicate a total recorded bandwidth for each border link and PoP. In some embodiments, another load aggregator 410 can generate aggregated data based on logs from other services (such as a log from a content delivery service that transmits data via HTTP) received from the logging server 402. The other load aggregator 410 can combine the logs to include each Domain Name System (DNS) resolver with a request rate (such as RPS) and data rate (such as bits or bytes per second) for each resolver. The other load aggregator 410 can generate aggregated that includes pairs of data between a resolver and load (such as a request rate and/or a data rate). The other load aggregator 410 can also receive a list of PoPs for each resolver, which can be ordered in decreasing order of latency or other criteria.

At block 606, demand on PoPs can be calculated. In some embodiments, the capacity allocator 408 can calculate demand on the PoPs. The capacity allocator 408 can calculate demand on PoPs based on the aggregated data. The capacity allocator 408 can calculate demand based on capacity units that a particular PoP would serve based on preferred criteria (such as latency or proximity) regardless of the capacity usage of the particular PoP. In some embodiments, the PoP recommender 416 can provide an ordered list of PoPs, which can be ordered based on the preferred criteria (such as latency or proximity). The capacity allocator 408 can use the aggregated data to determine the demand for each PoP regardless of whether the PoP provided service for that particular load, such as by aggregating the load for a client that would have been assigned to the PoP based on the preferred criteria (such as latency or proximity). The capacity allocator 408 can calculate total demand by combining the demand for multiple services at a PoP, which can be expressed as capacity units. In some embodiments, the capacity allocator 408 can calculate the total demand for each PoP by selecting the first in-service PoP in the list for each resolver entry and combining the capacity units calculated from the request and data rates in the log data for each resolver. The capacity allocator 408 can calculate the total demand for other services at each PoP by selecting the first in-service PoP in the list for each IP prefix and combining the capacity units calculated from data rates in the log data for each IP prefix.

In some embodiments, the capacity allocator 408 can receive a preferred point of presence for each IP prefix from a set of IP prefixes. The PoP recommender 416 can provide an ordered list of PoPs, which can be ordered based on the preferred criteria (such as latency or proximity), for each IP prefix. The capacity allocator 408 can identify, from the IP prefix and recorded bandwidth pairs, a subset of pairs where the point of presence is the preferred point of presence for an IP prefix in the IP prefix and recorded bandwidth pairs. The capacity allocator 408 can calculate the first demand from the recorded bandwidths in the subset of pairs. In some embodiments, the capacity allocator 408 can receive a preferred point of presence for each resolver from a set of resolvers. The PoP recommender 416 can provide an ordered list of PoPs, which can be ordered based on the preferred criteria (such as latency or proximity), for each resolver. The capacity allocator 408 can identify, from the resolver and load pairs, a subset of pairs where first point of presence is the preferred point of presence for a resolver in the pairs. The capacity allocator 408 can calculate the demand from the loads in the subset of pairs. As described herein, a load can include a request rate and/or a data rate. The capacity allocator 408 can calculate demand in capacity units by applying an equation to the request rate and/or the data rate from the loads in the subset of pairs.

At block 608, the PoPs can be ordered based on demand and capacity. The capacity allocator 408 can order PoPs based on the demand. The capacity allocator 408 can process those PoPs with the highest demand first. At block 610, it can be determined whether any of the PoPs (starting with the PoP with the highest demand and proceeding in order of decreasing demand) has a demand that exceeds its capacity. If capacity at the PoP is insufficient for the demand, the method proceeds to block 612 to determine the capacity allocations for the prioritized PoP with relatively high demand. The capacity allocator 408 can calculate a ratio that is proportional to the respective services competing for capacity at the PoP. If a PoP has one-hundred capacity units, demand for a streaming egress service is twenty capacity units and demand for a content delivery service is one-hundred and eighty capacity units, then the capacity allocator 408 can assign ninety capacity units (or ninety percent) to the content delivery service and ten capacity units to the streaming egress service. In some embodiments, a capacity allocation value can be a ratio or a value in capacity units. In other embodiments, a capacity allocation value can be a request rate or a data rate. At block 614, it is determined if there are more PoPs to process. If there are more PoPs, the method 500 returns to the capacity determination at block 610 to process more priority PoPs and if those PoPs have insufficient capacity then the method 600 determines additional capacity allocations for additional PoPs.

If capacity at the PoP is sufficient for the demand, the method proceeds to block 616 to redistribute any excess demand (if there is any) among the remaining PoPs. The capacity allocator 408 can reassign the overflow demand to the remaining PoPs. The capacity allocator 408 can determine that a combined demand exceed the capacity for a PoP. The capacity allocator 408 can calculate an excess demand based on a difference between the capacity for the point of presence and a combined value for the total demand at a PoP. The method 600 can return to block 608 to reorder the remaining PoPs based on demand. Accordingly, the method 500 can process PoPs in an iterative manner and determine capacity allocation changes until there are no more PoPs to process. For the remaining PoPs, if demand for the PoP is below its capacity, then the capacity limits for the PoP may not have to be changed. The capacity allocator 408 can apply a bin packing algorithm in a looping manner to assign the capacity units to the PoPs.

At block 618, demand on border links can be calculated. In some embodiments, the capacity allocator 408 can calculate demand on the border links. The capacity allocator 408 can calculate demand on border links based on the aggregated data. The capacity allocator 408 can calculate demand based on capacity units that a particular border link would serve based on preferred criteria (such as latency or proximity) regardless of the capacity usage of the particular border link. In some embodiments, the PoP recommender 416 can provide an ordered list of PoPs, which can be ordered based on the preferred criteria (such as latency or proximity). The capacity allocator 408 can use the aggregated data to determine the demand for each border link regardless of whether the border link provided service for that particular load, such as by aggregating the load for a client that would have been assigned to a PoP within the border link based on the preferred criteria (such as latency or proximity). The capacity allocator 408 can calculate total demand by combining the demand for multiple services at a border link, which can be expressed as capacity units. In some embodiments, the capacity allocator 408 can calculate the total demand for each border link by selecting the first in-service PoP (at a border link) in the list for each resolver entry and combining the capacity units calculated from the request and data rates in the log data for each resolver. The capacity allocator 408 can calculate the total demand for other services at each PoP by selecting the first in-service PoP (at a border link) in the list for each IP prefix and combining the capacity units calculated from data rates in the log data for each IP prefix.

At block 620, capacity allocations can be changed based on demand. The capacity allocator 408 can determine whether any border links (starting with the PoP with the highest demand and proceeding in order of decreasing demand) has a demand that exceeds its capacity. If capacity at the border link is insufficient for the demand, the capacity allocator 408 can direct demand to PoPs at different border links and recalculate the capacity allocations at those PoPs and border links. At block 622, the capacity allocation changes can be transmitted. The traffic controller 412 can transmit the determined capacity allocation changes from the capacity allocator 408 to the PoPs. The traffic controller 412 can transmit a capacity allocation change message to the PoP, which can cause a minimum or maximum capacity allocation to be increased or reduced for a service at the PoP.

Figure 7:
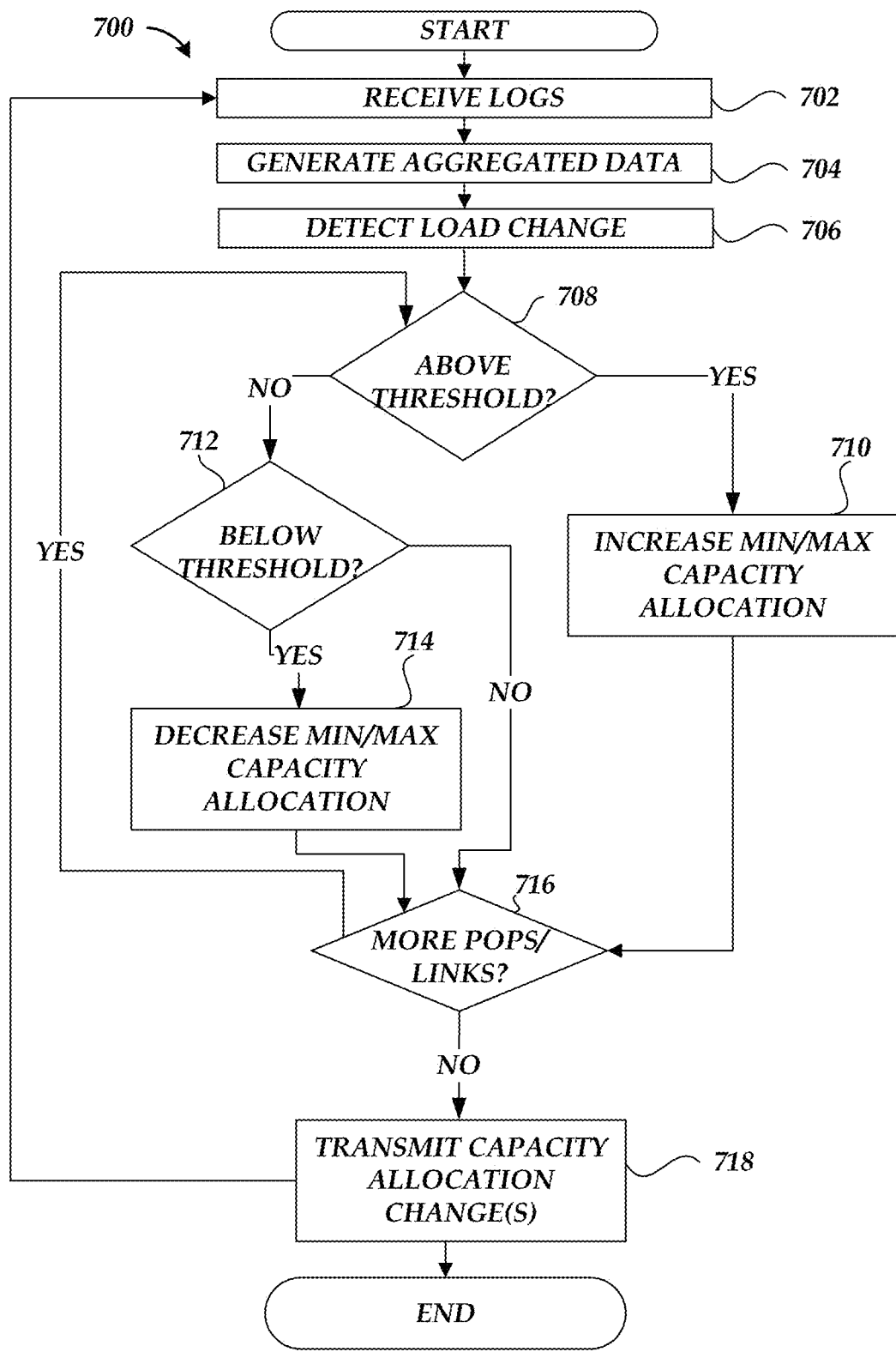
FIG. 7 is a flow diagram depicting another method for dynamically allocating capacity in a computer network.

FIG. 7 is a flow diagram depicting another method 700 implemented by the routing and capacity management system 110 for dynamically allocating capacity in a computer network. As described herein, the routing and capacity management system 110 may include a capacity allocator 408 and a traffic controller 412. In some embodiments, the capacity allocator 408 and a traffic controller 412 may implement aspects of the method 700. Some aspects of the method 700 may be implemented by other components of the routing and capacity management system 110, such as the logging server 402, the streaming load aggregator 404, the other load aggregator 410, and/or the PoP recommender 416. Moreover, some aspects of the method 600 may be described above with respect to FIGS. 3, 4, and 5.

Beginning at block 702, logs can be received. The block 702 of FIG. 7 for receiving logs can be similar to blocks 502, 602 of FIGS. 5 and 6 for receiving logs. As described herein, the logging server 402 can receive logs from a PoP 132A. The logging server 402 can receive a client usage log from a streaming egress service 104A executing at a PoP 132A. A client usage log can include recorded bandwidths for client IP addresses. As described herein, the PoP 132A can include a computing device that is executing multiple services 104A, 16A, such as a streaming egress service and a content delivery service. At block 704, aggregated data can be generated. The block 704 of FIG. 7 for generating aggregated data can be similar to block 506, 604 of FIGS. 5 and 6 for generating aggregated data. As described herein, the aggregators 404, 410 can calculate load as measure in capacity units. The aggregators 404, 410 can calculate, from the logs, a total data rate and/or request rate for a service at the point of presence. The aggregators 404, 410 can apply an equation to the total data rate and/or request rate that outputs the load measured in capacity units.

At block 706, a load change can be detected. In some embodiments, the capacity allocator 408 can detect load changes in PoPs or border links based on current and historical aggregated data. The capacity allocator 408 can detect that the load at a PoP or border link for a content streaming service changed from zero to one capacity unit (or any other change in capacity units) in subsequent aggregated data reports.

At block 708, it can be determined whether the current load for the PoP or border link is above a threshold. In some embodiments, the capacity allocator 408 can determine that a load for a service at a PoP or border link exceeds a threshold value. The capacity allocator 408 can have different capacity allocation thresholds for determining whether any minimum capacity allocation or maximum capacity allocation changes need to be set (which can be subject to further change). In some embodiments, the capacity allocator 408 can require that for a minimum or maximum capacity allocation change to be triggered, the current load for PoPs associated with a particular service (such as a content streaming service) must each exceed the threshold capacity allocation. As described herein, the aggregated data can include pairs between a PoP and a load for a service at the PoP. The capacity allocator 408 can determine, from the aggregated data, for each point of presence in the aggregated data with a computing device executing the service that a respective load for the service at the point of presence exceeds a threshold value. If the one or more loads for PoP(s) or a border link exceed the threshold, the method 500 proceeds to the block 710 for increasing a minimum and/or maximum capacity allocation.

At block 710, a minimum capacity allocation and/or maximum capacity allocation can be increased. In some embodiments, the capacity allocator 408 can increase a minimum capacity allocation and/or maximum capacity allocation at one or more PoPs or a border link based on fixed value(s), such as increasing from one unit to five units, then ten units, thirty units, fifty units etc. In other embodiments, the capacity allocator 408 can increase a minimum capacity allocation and/or maximum capacity allocation at one or more PoPs or a border link based on a percentage value. As described herein, in some embodiments, the capacity allocator 408 can increase a minimum capacity allocation and/or maximum capacity allocation at multiple PoPs if the multiple PoPs have each satisfied the threshold requirements previously discussed with respect to block 708. The minimum/maximum capacity allocation value for a service can be higher than a previous minimum/maximum capacity allocation value. In some embodiments, the capacity allocator 408 can determine whether a current time is between a start time and an end time for an event. If the current time is during an event, the capacity allocator 408 can determine a maximum capacity allocation value based on a peak expected bandwidth for the event. At block 716, if there are more PoPs or border links for processing, the method 700 can return to block 708 to check the additional PoPs or border links. Otherwise, the method 700 proceeds to block 718 for transmitting the capacity allocation change(s). The capacity allocator 408 can determine a total capacity for a point of presence or a border link. The capacity allocator 408 can determine a capacity allocation value for a first service (such as a streaming egress service) at a PoP or border link. The capacity allocator 408 can then subtract the first capacity allocation value from the total capacity to result in the second capacity allocation value for a second service at the same PoP or border link.

At block 712, it can be determined whether the current load at any PoPs or border links are below a particular threshold. The capacity allocator 408 can determine that the current load of one or more PoPs or a border link is below a threshold. In some embodiments, the capacity allocator 408 can require that multiple PoPs each have a load below the same threshold at a particular point in time for block 712 is satisfied and the method 700 can proceed to block 714 to decrease a capacity allocation. As described herein, the aggregated data can include pairs between a PoP and a load for a service at the PoP. The capacity allocator 408 can determine, from the aggregated data, for each point of presence in the aggregated data with a computing device executing the service that a respective load for the service at the point of presence is below a threshold value. If the block for checking whether the current load at the PoP(s) or the border link are below the threshold is not satisfied, the method 700 can proceed to block 716 to check for more PoPs or border links.

At block 714, a minimum capacity allocation and/or maximum capacity allocation can be decreased. In some embodiments, the capacity allocator 408 can decrease a minimum capacity allocation and/or maximum capacity allocation at one or more PoPs or a border link based on fixed value(s), such as decreasing from fifty units to thirty units, then ten units, five units, one unit etc. In other embodiments, the capacity allocator 408 can decrease a minimum capacity allocation and/or maximum capacity allocation at one or more PoPs or a border link based on a percentage value. As described herein, in some embodiments, the capacity allocator 408 can decrease a minimum capacity allocation and/or maximum capacity allocation at multiple PoPs if the multiple PoPs have each satisfied the threshold requirements previously discussed with respect to block 712.

As mentioned above, at block 716, if there are more PoPs or border links for processing, the method 700 can return to block 708 to check the additional PoPs or border links. Otherwise, the method 700 proceeds to block 718 for transmitting the capacity allocation change(s). The traffic controller 412 can transmit the capacity allocation changes from the capacity allocator 408 to the PoPs with capacity allocation changes. The traffic controller 412 can transmit the capacity allocation value(s) to the PoP(s). The traffic controller 412 can transmit a first capacity allocation value for a first service and a second capacity allocation value for a second service at the same PoP. The traffic controller 412 can transmit an indication whether the capacity value is for a minimum capacity allocation or a maximum capacity allocation. In some embodiments, the method 700 can operate in a loop and process all PoPs first and then all border links second.

While some of the solutions and techniques described herein address co-locating content delivery services in a CDN and streaming egress services on the same computing devices in the same PoPs, those same solutions and techniques can be applied to any service type in other embodiments. In some embodiments, none of the co-located services may use a streaming protocol. Moreover, in some embodiments, some of the solutions and techniques described herein can be applied to co-locating more than two services, such as three, four, or even more services on the same computing devices in the same PoPs.

Not necessarily all objects or advantages may be achieved in accordance with any particular embodiment described herein. Thus, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied. The term "substantially" when used in conjunction with the term "real time" can refer to speeds in which no or little delay occurs.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for integrating a substantially real-time streaming process in a content delivery network, the computer-implemented method comprising:
   under control of a computer hardware processor configured with specific computer executable instructions,
   receiving, from a streaming control plane, a first request for a point of presence, wherein the first request for the point of presence comprises a first client IP address;
   selecting, from a plurality of points of presence, a first point of presence for the first client IP address;
   transmitting, to the streaming control plane, a first response to the first request, the first response comprising a first identifier associated with the first point of presence, wherein the first point of presence comprises a computing device executing a first streaming egress service and a content delivery service;
   receiving, from the first streaming egress service, a first client usage log comprising a first recorded bandwidth associated with the first client IP address;
   generating, from a plurality of client usage logs comprising the first client usage log, aggregated data indicating at least a first load value at a first border link;
   identifying, based on the aggregated data, a range of client IP addresses associated with high bandwidth usage at the first border link; and
   transmitting, to the streaming control plane, an eviction message, wherein the eviction message comprises the range of client IP addresses for possible eviction from a point of presence.

2. The computer-implemented method of claim 1, wherein generating the aggregated data further comprises:
   receiving network topology metadata comprising a plurality of mapping entries, wherein a first mapping entry of the plurality of mapping entries comprises a first IP prefix, the first point of presence, and a first border link; and
   calculating, from the plurality of client usage logs and the network topology metadata, the first load value at the first border link, wherein calculating the first load value at the first border link further comprises:
      combining (i) the first recorded bandwidth associated with the first border link and (ii) a second recorded bandwidth associated with the first border link.

3. The computer-implemented method of claim 2, wherein identifying the range of client IP addresses associated with high bandwidth usage at the first border link further comprises:
   determining, from the aggregated data, that the first load value at the first border link is at or above a capacity threshold value; and
   identifying, from the network topology metadata, the range of client IP addresses from the first IP prefix associated with the first border link.

4. The computer-implemented method of claim 2, further comprising:
   receiving, from a streaming control plane, a second request for a point of presence, wherein the second request for the point of presence comprises a second client IP address;
   determining, from the aggregated data, that the first load value at the first border link is at or above a capacity threshold value;
   determining, from the network topology metadata, that the first point of presence is associated with the first border link;
   selecting, from the plurality of points of presence, a second point of presence instead of the first point of presence; and
   transmitting, to the streaming control plane, a second response to the second request, the second response comprising a second identifier associated with the second point of presence.

5. The computer-implemented method of claim 1, further comprising:
   identifying, from the plurality of points of presence, a subset of points of presence for the first client IP address,
   wherein identifying the subset of points of presence further comprises:
      ordering the subset of points of presence based on estimated latency with the first client IP address, and
   wherein transmitting the first identifier associated with the first point of presence further comprises:
      transmitting, to the streaming control plane, an ordered set of identifiers for the subset of points of presence.

6. A system comprising:
   a data storage medium; and
   one or more computer hardware processors in communication with the data storage medium, wherein the one or more computer hardware processors are configured to execute computer-executable instructions to at least:
      receive, from a streaming control plane, a first request for a point of presence, wherein the first request for the point of presence comprises a first client IP address;
      identify, from a plurality of points of presence, a first point of presence for the first client IP address;
      transmit, to the streaming control plane, a first response to the first request, the first response comprising a first identifier associated with the first point of presence, wherein the first point of presence comprises a computing device executing a first streaming egress service and a second network service;
      receive, from the first streaming egress service, a first client usage log comprising a first recorded bandwidth associated with the first client IP address;
      generate, from a plurality of client usage logs comprising the first client usage log, aggregated data indicating at least a first load value at a first border link;
      determine, from the aggregated data, that the first load value at the first border link is at or above a first capacity threshold value;
      determine, from network topology metadata, that the first point of presence is associated with the first border link; and
      cause network traffic to be directed away from the first point of presence.

7. The system of claim 6, wherein to cause the network traffic to be directed away from the first point of presence, the one or more computer hardware processors are configured to execute additional computer-executable instructions to at least:
   identify, based on the aggregated data, a range of client IP addresses associated with high bandwidth usage at the first border link; and
   transmit, to the streaming control plane, an eviction message, wherein the eviction message comprises the range of client IP addresses for possible eviction from a point of presence.

8. The system of claim 7, wherein the eviction message comprises an identifier for the first streaming egress service, the system further comprising:
the streaming control plane comprising a second computer hardware processor, wherein the second computer hardware processor is configured to at least:
identify, from the range of client IP addresses, the first client IP address of a client computing device in communication with the first streaming egress service; and
transmit, to the client computing device associated with the first client IP address, a message configured to cause the client computing device to disconnect from the first streaming egress service.

9. The system of claim 7, wherein the eviction message comprises an eviction threshold value, the system further comprising:
the streaming control plane comprising a second computer hardware processor, wherein the second computer hardware processor is configured to at least:
calculate a total bandwidth value associated with one or more streaming clients associated with the range of client IP addresses;
determine that the total bandwidth value is at or above the eviction threshold value; and
transmit, to a client computing device associated with a client IP address within the range of client IP addresses, a message configured to cause the client computing device to disconnect from the first streaming egress service.

10. The system of claim 7, wherein to generate the aggregated data, the one or more computer hardware processors are configured to execute additional computer-executable instructions to at least:
receive network topology metadata comprising a plurality of mapping entries, wherein a first mapping entry of the plurality of mapping entries comprises a first IP prefix, the first point of presence, and a first border link; and
calculate, from the plurality of client usage logs and the network topology metadata, the first load value at the first border link.

11. The system of claim 10, wherein to identify the range of client IP addresses associated with high bandwidth usage at the first border link, the one or more computer hardware processors are configured to execute further computer-executable instructions to at least:
identify, from the network topology metadata, the range of client IP addresses from the first IP prefix associated with the first border link.

12. The system of claim 6, wherein to cause the network traffic to be directed away from the first point of presence, the one or more computer hardware processors are configured to execute additional computer-executable instructions to at least:
receive, from the streaming control plane, a second request for a point of presence, wherein the second request for the point of presence comprises a second client IP address;
select, from the plurality of points of presence, a second point of presence instead of the first point of presence; and
transmit, to the streaming control plane, a second response to the second request, the second response comprising a second identifier associated with the second point of presence.

13. The system of claim 6, wherein the one or more computer hardware processors are configured to execute additional computer-executable instructions to at least:
identify, from the plurality of points of presence, a subset of points of presence for the first client IP address, wherein to transmit the first identifier associated with the first point of presence, the one or more computer hardware processors are configured to execute further computer-executable instructions to at least:
transmit, to the streaming control plane, a set of identifiers for the subset of points of presence.

14. A system comprising:
a data storage medium; and
one or more computer hardware processors in communication with the data storage medium, wherein the one or more computer hardware processors are configured to execute computer-executable instructions to at least:
receive, from a first streaming egress service, a first client usage log comprising a first recorded bandwidth associated with a first client IP address, wherein a first point of presence comprises a computing device executing the first streaming egress service and a second network service;
generate, from a first plurality of client usage logs comprising the first client usage log, first aggregated data indicating at least a first load value at a first border link;
receive, from a streaming control plane, a first request for a point of presence, wherein the first request for the point of presence comprises a second client IP address;
determine, from the first aggregated data, that the first load value at the first border link is at or above a first capacity threshold value;
determine, from network topology metadata, that a first point of presence is associated with the first border link;
select, from a plurality of points of presence, a second point of presence instead of the first point of presence; and
transmit, to the streaming control plane, a first response to the first request, the first response comprising an identifier associated with the second point of presence.

15. The system of claim 14, further comprising:
the computing device executing the first streaming egress service, the computing device comprising a second computer hardware processor, wherein the second computer hardware processor is configured to at least:
transmit, to the one or more computer hardware processors, a second client usage log based on a frequency.

16. The system of claim 15, wherein the one or more computer hardware processors are configured to execute additional computer-executable instructions to at least:
generate, from a second plurality of client usage logs comprising the second client usage log, second aggregated data indicating at least a second load value at a first border link;
receive, from the streaming control plane, a second request for a point of presence, wherein the second request for the point of presence comprises the first client IP address;
determine, from the second aggregated data, that the second load value at the first border link is below the first capacity threshold value;

determine, from the network topology metadata, that the first point of presence is associated with the first border link;

select, from the plurality of points of presence, the first point of presence; and transmit, to the streaming control plane, a second response to the second request, the second response comprising a first identifier associated with the first point of presence.

17. The system of claim 14, wherein the network topology metadata comprises a plurality of mapping entries, wherein a first mapping entry of the plurality of mapping entries comprises a first IP prefix, the first point of presence, and a first border link, wherein to generate the first aggregated data, the one or more computer hardware processors are configured to execute additional computer-executable instructions to at least:

calculate, from the first plurality of client usage logs and the network topology metadata, the first load value at the first border link.

18. The system of claim 17, wherein the one or more computer hardware processors are configured to execute further computer-executable instructions to at least:

identify, based on the first aggregated data, a range of client IP addresses associated with the first border link;

calculate, based on the first aggregated data, a total bandwidth value associated with the range of client IP addresses;

determine that the total bandwidth value is at or above an eviction threshold value; and transmit, to the streaming control plane, an eviction message, wherein the eviction message comprises the range of client IP addresses for possible eviction from the first point of presence.

19. The system of claim 17, wherein the network topology metadata comprises a respective capacity threshold value for each border link in the plurality of mapping entries.

20. The system of claim 14, wherein the first streaming egress service is configured to transmit network packets substantially in real time with an event.

* * * * *